United States Patent [19]

Wong

[11] 4,193,234
[45] Mar. 18, 1980

[54] STABILIZING OF STRUCTURES

[75] Inventor: Henry H. Y. Wong, Bearsden, Scotland

[73] Assignee: National Research Development Corporation, London, England

[21] Appl. No.: 881,050

[22] Filed: Feb. 24, 1978

[30] Foreign Application Priority Data

Feb. 24, 1977 [GB] United Kingdom ............... 07911/77
Aug. 13, 1977 [GB] United Kingdom ............... 34089/77

[51] Int. Cl.$^2$ ............................................. E04H 9/14
[52] U.S. Cl. ..................................... 52/173 R; 52/84; 174/42
[58] Field of Search .................. 52/173 R, 84; 174/42

[56] References Cited

U.S. PATENT DOCUMENTS

| | | | |
|---|---|---|---|
| 2,270,537 | 1/1942 | Ludington | 52/173 |
| 2,270,538 | 1/1942 | Ludington | 52/173 X |
| 3,076,533 | 2/1963 | Scruton et al. | 52/173 X |
| 3,280,524 | 10/1966 | Hull | 52/173 |
| 3,381,424 | 5/1968 | Butler | 52/173 X |
| 4,005,557 | 2/1977 | Kramer et al. | 52/24 X |

FOREIGN PATENT DOCUMENTS 2243213  3/1973  Fed. Rep. of Germany ........ 52/173 R

OTHER PUBLICATIONS

Electrical Times, Jul. 4, 1968, two pages.
Journal of the Engineering Mechanics Division, Proceedings ASCE, Paper No. 1030, pp. 1-22, Jul. 1956.

Primary Examiner—Alfred C. Perham
Attorney, Agent, or Firm—Finnegan, Henderson, Farabow, Garrett & Dunner

[57] ABSTRACT

A structure protected against flow-induced oscillations by carrying a shroud around at least part of its periphery, the shroud comprising peripherally-spaced members of slatted shape. This shape, and some dimensional limits, are necessary to create the right type of flow in the passage between the shroud and the structure. The invention covers structures shrouded around their entire periphery, and incompletely-shrouded structures: the performance of the latter can be particularly advantageous when the direction of flow relative to the structure is predictable. Where an installation comprises several structures, the invention may also be used to control the wake from the more upstream, thus diminishing buffeting of the more downstream.

12 Claims, 17 Drawing Figures

STABILIZING OF STRUCTURES

This invention relates to structures which may in use be at least partly immersed in fluid which is in motion relative to the structure, and to means for stabilising the structure against vibration due to that relative motion. The invention may thus apply, for instance, to structures of bluff (that is to say, non-streamlined) cross-sectional shape such as chimney stacks and tall towers subject to the wind, and to the legs of off-shore structures such as oil rigs and conductor tubes, subject to the flow of both water and wind and to the waves that form at the interface between them. The invention may also apply to periscopes, aerials and other bluff members projecting from moving craft that travel within relatively still masses of gas or liquid, so that here the movement of the craft sets up the required relative motion. The invention applies equally to cases that differ from those examples already quoted in that the elongated structures are supported from both ends; suspended pipelines subject to water current are examples of these.

Among many types of flow-excitation, vortex excitation is the most common cause of oscillation of such structures. When a fluid flows across a structure with a bluff cross-section, flow separation will occur, resulting in the formation and shedding of vortices on alternate sides of the structure. Since these vortices are regions of low pressure, their creation leads to forces in opposite lateral directions which act upon the structure in a periodic manner with a frequency corresponding to the vortex-shedding frequency. If the inherent structural damping is low, these alternating forces will tend to induce the structure into oscillation with increasing amplitude.

Other effects to which bluff structures are liable, when subjected to motion relative to masses of fluid, include high drag and wake buffeting. The latter effect is of particular importance when several structures, for instance a group of chimneys or a group of piles founded in the bed of a river or of tidal water, stand close to each other. When strong vortices are formed and shed by the mechanism just described, their existence will persist for some distance downstream until they form into a wake of generally uniform turbulence. A structure situated closely downstream of another will suffer buffeting from these vortices. If the strength of the vortices can be weakened and their periodic formation disrupted at the source, that is to say at the upstream structure, wake buffeting of the downstream structure will be diminished.

Many stabilising devices for bluff enlongated structures have been proposed. In one class of these devices, exemplified by U.K. Pat. No. 907,851 and U.S. Pat. No. 3,076,533, a spiral rib or "strake" is fixed to the outer surface of the structure over at least part of its length, usually the most exposed part. Such devices have been found successful and have been much used. However the application of such strakes has been found in practice to be suitable only for structures with a circular or near-circular section, and each strake has had to be made to fit the surface curvature of its structure. The fixing has often required skilled labour, and while such devices have often effectively stabilised the structures to which they are fitted their effect on the wake buffeting of any downstream structures has often been only slight. Also, because of the strong vortices formed behind the strakes, higher drag may be expected, and such devices have always required a considerable and continous length of strake; no cheaper and yet practicable system has been found for using shorter and perhaps discontinous lengths of strake to protect structures in circumstances where flows of dangerous strength occur in only one direction.

Another known method of stabilising a device, described for instance in German laying-open print No. P 2243213, comprises shrouding the structure with a series of rods, preferably of circular section, spaced apart from the structure and from each other and with their axes parallel to that of the structure. Many uncertainties still surround the theory of why such devices may have worked in certain applications, and in particular it is still uncertain whether such devices have any general potential to dampen the flow-induced oscillations of the structures to which they are fixed, other than by virtue of the extra mass that they add to that of the structure itself.

Yet another known form of device, described for example in Proc. A.S.C.E, 1956 and in "Electrical Times" of July 4, 1968, comprises a perforated cylindrical shroud fitted around and spaced apart from a cylindrical structure, the shroud having a appearance of a sheet of lattice form, bent to form a cylinder. The theory of such a shroud remains in doubt also, but because fluid can only enter and leave the space between the shroud and the structure by way of individual lattice perforations it is apparent that flow of fluid within this space must be complex, probably involving vortices in three dimensions.

The present invention is based upon appreciating that at least one shroud (a plurality of such shrouds arranged concentrically is also possible) composed of slats, spaced apart from themselves and from the structure and arranged with their axes generally parallel to the slope of the structure surface, may stabilise both the structure itself and downstream structures. A proportion of the fluid incident upon the structure enters the substantially smooth-walled passage defined between the structure surface and the inward-facing surfaces of the slats, and it is believed that a principal function of the shroud is to maintain a vigorous and stable "inner flow" within this passage. Through the action of force mixing where the flow enters, a high-intensity turbulent "inner flow" tends to be set up within the passage, the growth of circulation and hence of vortices within that flow is restricted, and the aligned inner surfaces of the slats exert a restraining force on the inner flow, preventing it from breaking away from the structure surface prematurely. When finally the inner flow does so break away, and eject through gaps between slats into the the "outer flow"—that is to say, the flow of the remainder of the incident fluid past the structure over the outer surfaces of the slats—the effect is then to inject energy into the outer flow so as to delay the formation of the vortices whose unstabilising effects upon the structure have already been summarised. By reason of the geometrical shape of the slats and their placing and spacing around the structure, ejection of the inner flow through the slot-shaped gaps between adjacent slats tends to take place in a direction nearly tangential to the direction of the "outer flow" where the ejecting fluid enters it. This relative direction enhances the energy-transfer process: early separation of the outer flow would tend to be provoked if the direction of the fluid leaving the inner flow had a large component in a direction normal to that of the outer flow. The shape of the slots between adjacent slats also tends to offer low discharge resistance to the emerging fluid, thus helping to preserve its energy, and the most natural alignment of slats often places them along or close to a natural streamline of the total flow as it passes the structure, so that the momentum of the fluid in both inner and outer flow is well preserved; tests also suggest that this placement contributes to a more uniform wake to the rear of the structure, and to the smoothing-out of any surface waves that may pass the structure.

The invention is defined by the claims at the end of this specification, and will now be described by way of example with reference to the accompanying drawings in which:

Figure 1:
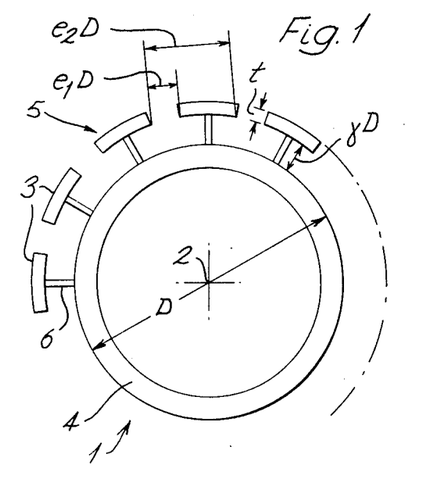
FIG. 1 is a diagrammatic cross-section through a stabilised cylindrical body, illustrating some significant parameters.

FIG. 1 is a cross-section through a hollow cylindrical structure 1 exposed in use to the impact of a mass of fluid, having at least a component of flow relative to the structure in any direction perpendicular to the structure axis 2. The structure is completely surrounded by a shroud comprising slats 3, spaced apart from themselves and from the outer surface 4 of structure 1. The shroud 5 may be anchored to structure 1 by any means which do not substantially interrupt its own essentially slatted shape, or that of the passage defined between the slats and the structure; for instance by radial pegs 6 anchoring each slat individually to surface 4.

By slat we mean, generally, any three-dimensional solid body much greater in length than in width, and in turn greater in width than in thickness. FIG. 1 illustrates some parameters relevant to the present invention. If D is the external diameter of structure 1, if $e_1 D$ equals the circumferential length of the gap between adjacent slats and $e_2 D$ the length between the width end of one slat and the corresponding width end of the next, then $e_1/e_2$, representing effectively the ratio of the "open area" of the shroud to the total area of the shroud at the locality under consideration, will be referred to as $\alpha$. The width of each slat will equal $(e_2 - e_1)$. D, and the quantity $(e_2 - e_1)$ will be referred to as $\beta$. The distance between surface 4 and the inner surface of shroud 5 equals $\gamma D$, and the thickness t of each slat may be determined from the equation:

$$(e_2-e_1)\cdot(D/t)=\epsilon$$

It should be noted particularly that the four parameters $\alpha, \beta, \gamma$, and $\epsilon$, just defined, are all non-dimensional and related to an equivalent diameter D, which is the diameter of a notional circle representing the local curvature of the part of the structure under consideration. Of course if the structure is of circular section, as in FIG. 1, D is constant and is equal to the diameter of the section.

Figure 2:
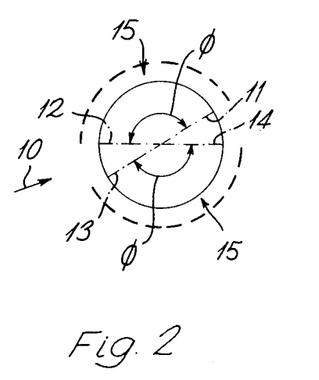
FIG. 2 is a similar view of another structure of circular section, supporting two part-peripheral shrouds.

In FIG. 1 the entire periphery of the structure is completely encompassed by the shroud. This is appropriate if the relative motion between the structure and the general mass of fluid around it has no fixed direction. FIG. 2 illustrates a structure 1 shrouded in a manner that is suitable when the direction 10 of relative motion of the structure and the fluid is known. Here it may be sufficient that the shroud extends only around those parts of the periphery of the structure, which will be referred to as "salient", that face in directions generally perpendicular to the known direction of known relative flow. In the case of a body of circular section, where the protruding parts of the periphery are equally "salient" in character, two equal segments of the circumstance, lying on opposite sides of the direction of flow, should be shrouded. Tests have shown that if a salient requires shrouding at all, then the peripheral extent of the salient should be such that the angle subtended between the perpendiculars to the tangents drawn to the surface of the structure at the two ends of the chosen salient should be not less than 60°. In FIG. 2, since the structure is of circular outline, the angles subtended by the perpendiculars 11 and 12, 13 and 14 dropped from the tangents at the ends of the two chosen transversely-facing salients 15 meet at the centre of the circle, at angles $\phi$ that are clearly greater than 60°.

Figure 3:
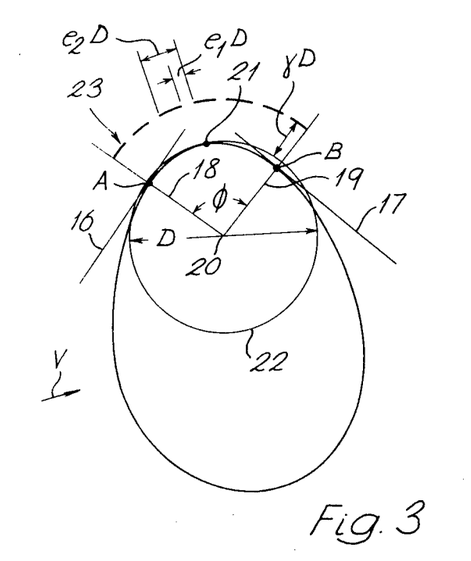
FIG. 3 is a similar diagrammatic view illustrating how the outline of a part-peripheral shroud, to protect only a salient of the cross-section of a structure, may be chosen.

FIG. 3 illustrates a convenient method, according to the invention, by which the alignment of the shroud around a chosen transverse salient of non-circular section may be chosen.

Let AB be the curved part of the salient to be shrouded. 16 and 17 are tangents at A and B respectively, and 18 and 19 are perpendicular lines intersecting at 20. 21 is the apex of the salient. The distance between 20 and 21 is the radius of a notional circle 22. D is thus the diameter of this notional circle, which in conjunction with chosen valves of $\alpha, \beta$ and $\gamma$ may be used to determine the details of the appropriate shroud for this salient of the structure. The path 23, on which the slats will actually be located, lies on an arc of a circle concentric with the notional circle 22 and is a useful approximation to the ideal solution that the slats should lie along a local streamline in the relative movement of the fluid around the salient. If the slats can lie along such a streamline then in theory they present the least possible obstruction to the fluid flow. The points A and B are so chosen that $\phi$ shall not be less than 60°.

Figure 4:
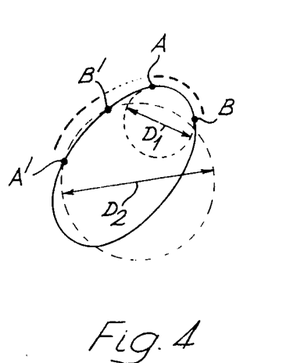
FIG. 4 is another similar view illustrating the shrouding of a structure of elliptical section.

FIG. 4 shows a structure of elliptical section, subject to flow without a fixed relative direction. The four critical salients are at each end of the major and minor axes, but for simplicity the shrouding of only one of each of these kinds of salient will be described. Once the salient end points A, B and A', B' are chosen the notional circles with diameters $D_1$, $D_2$ can be determined yielding the dimensions for the slats in group (a) in the major axis salient and group (b) in the minor axis salient. These groups can then be joined up by slats following an approximate path (c), thus leading to a shroud surrounding the entire periphery of the ellipse, and to complete the shroud the process may then be repeated in the other three quadrants. For convenience and economy, slats of equal width could be used throughout the shroud, but faithful adherence to the formulae already given would suggest continual variation of this and other key parameters of the shroud on moving round the periphery, on account of the continual variation of the diameter of the notional equivalent circle.

To offer the performance required of constructions according to this invention, tests have shown that the parameters $\alpha$, $\beta$, $\gamma$ and $\epsilon$ should lie approximately within the following ranges of value:

$\frac{1}{4} < \alpha < 3/5$ $1/16 < \beta < 1/5$ $1/12 < \gamma < 1/5$ $\epsilon > 3$ While the sides of the slats corresponding to the width and thickness dimensions will often be straight, this is not necessary provided a generally elongated cross-section is chosen: for instance, it may often be desirable for the cross-section to contain a gentle curvature to match that of the equivalent streamline, or in practice the circular surface, which the shroud is to follow.

Figure 5:
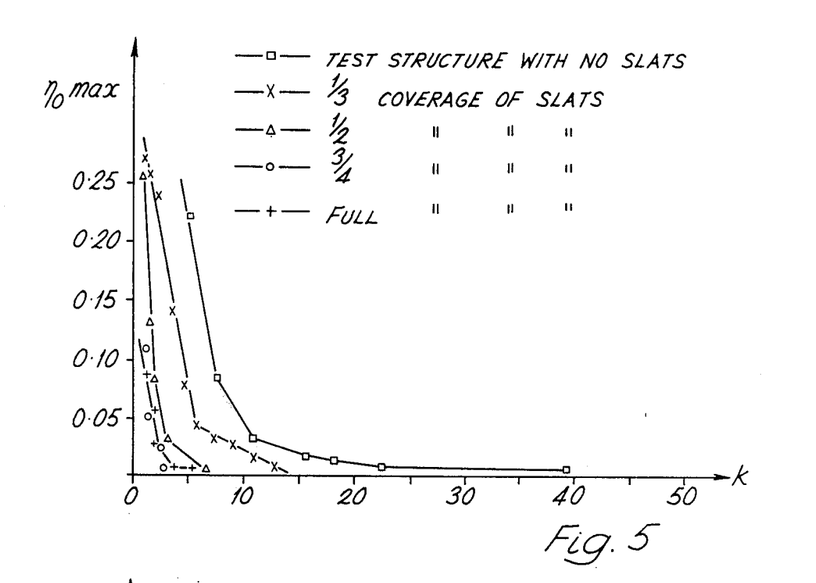
FIG. 5 is a graphical representation illustrating the maximum amplitude of oscillation of a test structure with and without stabilising devices.
Figure 6:
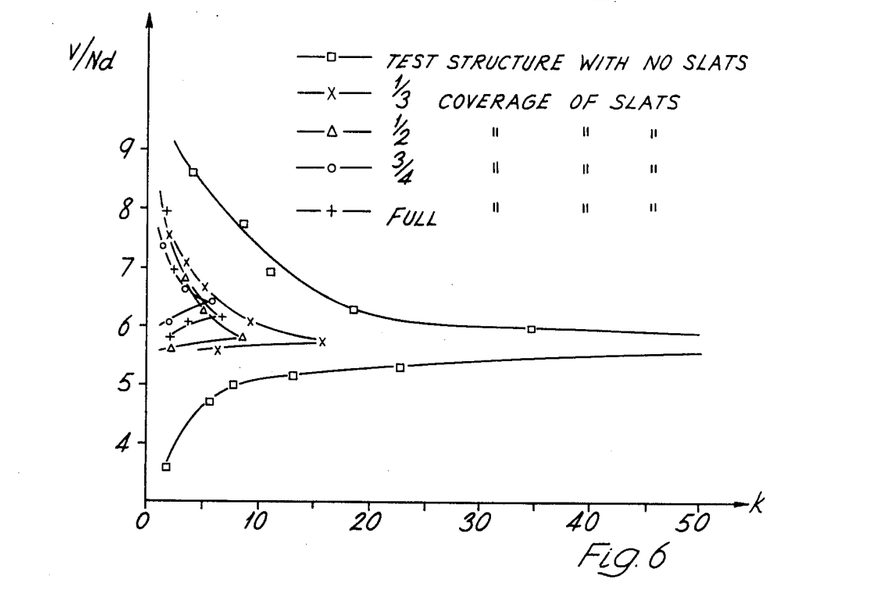
FIG. 6 shows other graphs, illustrating instead the boundary of stability for each structure.

FIGS. 5 and 6 relate to structures with peripherally-complete shrouds and show the stabilising effect of the present invention, the results having been obtained from wind-tunnel tests conducted on cylindrical model structures under three-dimensional flow conditions. FIG. 5 shows a quantity k plotted against a non-dimensional quantity $\eta_o$ max representing maximum amplitude of oscillation and in FIG. 6 the quantity k is plotted against V/Nd (where V is the relative velocity of structure and fluid, N the frequency of transverse vibration induced in the structure and d the mean dimension—that is to say in this case the diameter—of the section) to show the boundary of stability (the region to the right of each curve is a stable region) of the test structure both without a stabilising device and when fitted with stabilising devices, the slats of which cover one third, one half, three quarters and the whole length of the test structure. The dimensions of the slats and their spacing with respect to the test structure are those found by experiment to be particularly effective. The dimensions in this example are such that $\alpha$ is 0.40, $\beta$ is 1/11.5 and $\gamma$ is 1/7. In each graph, the abscissa represent the non-dimensional values of a damping coefficient of a structure given by the expression $k = 2\ M\delta_s/pd^2$ where M is the mass of the body per unit length, $\delta_s$ is a logarithmic decrement dependent on structure damping and is a parameter well known in the mechanical vibrational art.

p is the density of the fluid flowing past the structure.

d is the equivalent or mean diameter of the structure.

It will be noted that for a damping coefficient as low as k=6, the maximum amplitude is reduced to a quarter of that of a structure tested without the slats by using a slat length equal to one third of the length of the structure. With coverage by the slats of one half of the length oscillation is almost entirely suppressed at this level of structure damping. As most structures in practice would have a damping coefficient higher than 6, little advantage is obtained by increasing the slat length beyond 50% of the structure length. With a higher value of k, one-third length coverage may suffice.

Figure 7:
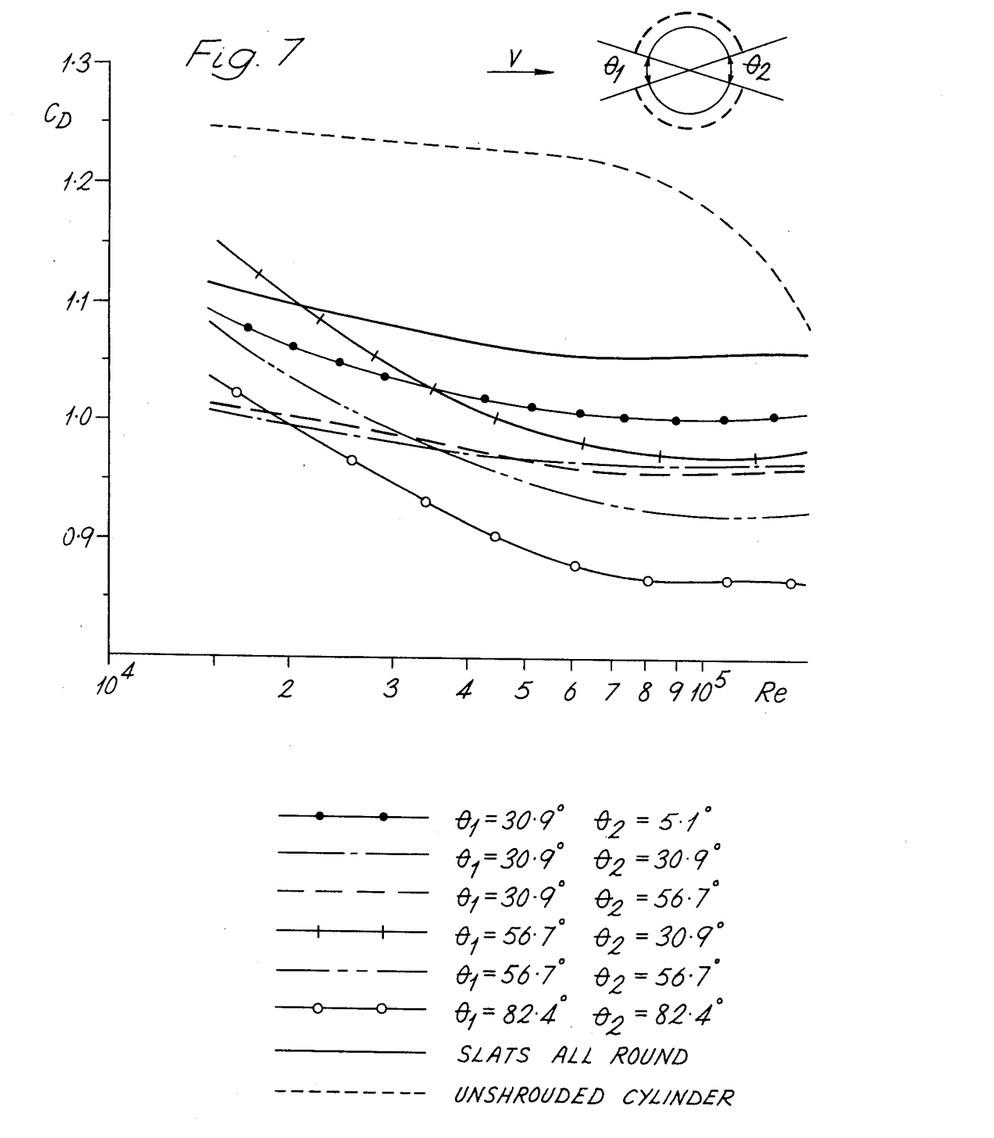
FIG. 7 shows other graphs, illustrating drag effects.

The graphs of FIG. 7 show the results of drag tests on a cylindrical structure, in which the drag co-efficient $C_D$ is based on the diameter of the plain cylinder and is plotted against Reynolds Number Re. The graphs show the results of tests on an unshrouded cylinder, one with a peripherally-complete shroud, and six other peripherally-incomplete shrouds where the angles $\theta_1$, $\theta_2$ of the unshrouded sectors, which face respectively upstream and downstream relative to the direction of the fluid flow, have a variety of values. For all the shrouded constructions, the slat dimensions were the same as for the tests of FIGS. 5 and 6. It will be seen that all the shrouded test structures have a marked reduction in drag compared with the unshrouded one, and that for all except very low values of Reynolds Number the incompletely-shrouded versions performed better than the one with the complete shroud, improvement generally increasing as the angles $\theta_1\ \theta_2$ increase. Of course the incompletely-shrouded versions can only seriously be considered when the direction V of movement of fluid relative to the structure is predictable.

Further tests to examine the effects of vortex excitation on wake buffeting, using a pair of identical models fitted with slats and a pair of plane models, indicated that up to a separating distance of 5 diameters measured between the centres of the models, the models fitted with the stabilising device are much superior to the plain models.

Figure 8:
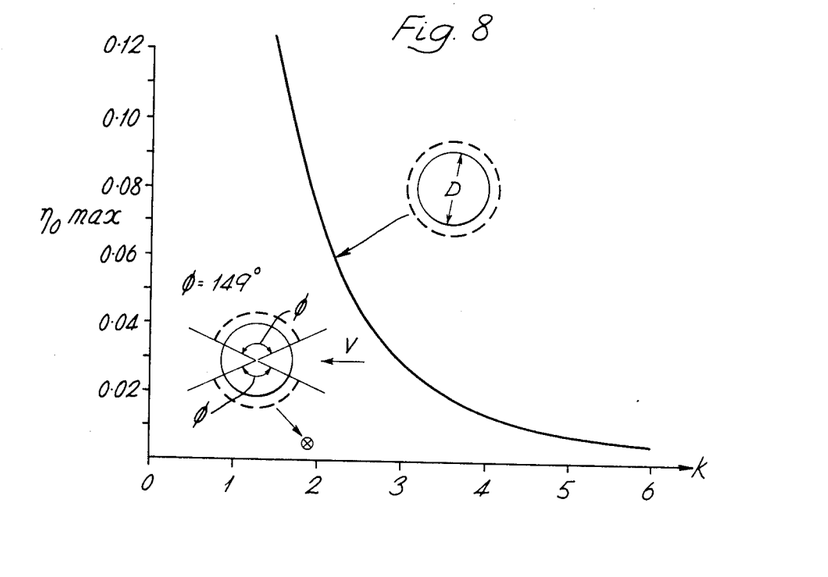
FIG. 8 is also graphical, and compares the oscillation amplitude of completely and incompletely shrouded test structures.

FIG. 8 illustrates oscillation amplitude effects, as did FIG. 5 but this time comparing the performance two circular-section model structures, the one completely shrouded (for use where the expected relative fluid flow is multidirectional, i.e. unpredictable) and the other incompletely shrouded for the predictable or unidirectional case. In these tests slats covered $\frac{2}{3}$ of the length of the model structure and the other relevant parameters used were:

|  | $\alpha$ | $\gamma$ | $\beta$ |
|---|---|---|---|
| Multidirectional case | 0.4 | 1/7 | 1/11.5 | and $\phi = 149°$ for the multidirectional case.

It will be noted from FIG. 8 that for a damping coefficient as low as k=1.8 (for practical structures the value of k could be as high as 10) oscillation of the model was almost entirely suppressed with the device arranged for unidirectional flow conditions (see spot value of less than 0.01D). The values obtained for flow without a predictable direction were higher but still a great improvement compared with results from most damping devices.

Figure 9:
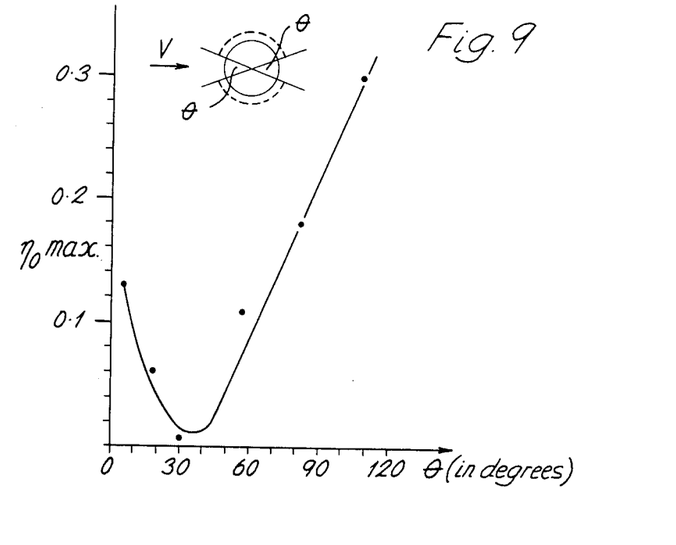
FIG. 9 is a graph illustrating comparing maximum oscillation with the degree of shrouding of an incompletely shrouded structure.

The graph of FIG. 9 further illustrates the behaviour under test of an incompletely-shrouded structure. Here $\theta_1$ equals $\theta_2$ (equals $\theta$), and $\theta$ is plotted against maximum oscillation (expressed in the same manner as in FIG. 5). This Figure makes it plain that for the particular model tested, oscillation fell to a minimum of less than 0.02 units with $\theta$ at a value of between 30° and 40°, agreeing well with the single example of the incompletely-shrouded case shown in FIG. 8.

Figure 10:
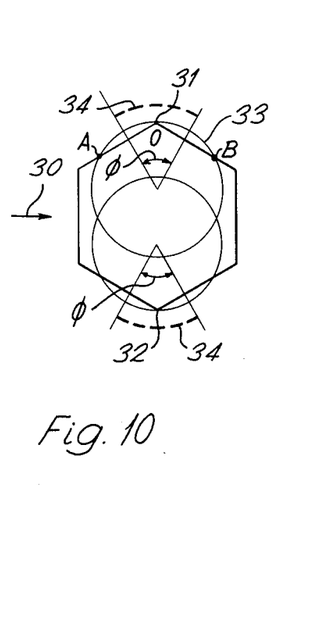
FIGS. 10 and 11 show applications of the invention to devices to protect salients of structures of polygonal section.
Figure 11:
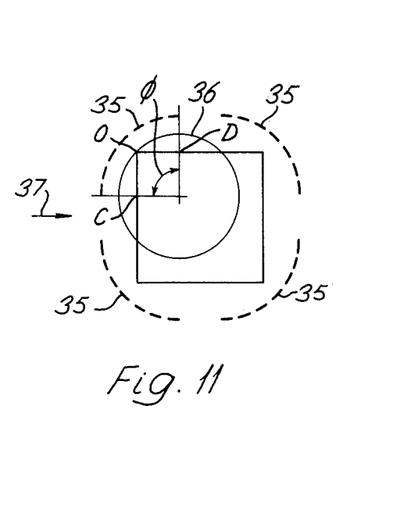

FIGS. 10 and 11 show applications of the present invention to structures of polygonal cross-section, in place of the structures of circular or other curved section already given as examples. FIG. 10 is a body of hexagonal section, exposed to relative fluid flow having a predictable direction 30. Only the two transversely-opposite vertices 31, 32 are shrouded, to cover a salient angle $\phi$ of 60°, and the equivalent circular curved surface 33 with which the slatted shroud 34 should lie parallel is shown for one of the vertices. In practice OA may equal OB and lie between ¼ and ½ the full length of a side of the hexagon. FIG. 11 shows a structure of square section with all four corners protected by a shroud 35 extending over a salient angle $\phi$ chosen at 90°; the equivalent circular curved surface 36 is shown at one of the vertices, and it is suggested that this degree of shrouding might indeed be sufficient for a square-sectioned structure not only if the relative direction of fluid flow is predictable, as at 37, but possibly even if it is not. If the latter is the case, then of course it should be more economical to shroud only the four corners of the structure than to complete the shroud around the whole periphery. In practice OC may equal OD and lie between ¼ and ½ of the full length of a side of the square.

Tests suggest that a structure of regular polygonal section having more than six sides may be treated, with reasonable approximation, as if it were of circular section.

Figure 12:
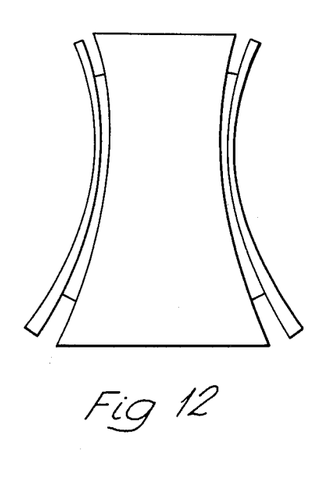
FIGS. 12 and 13 are diagrammatic side elevations of structures with a lengthwise taper, illustrating how individual slats of the shroud align with the surface of the structure.
Figure 13:
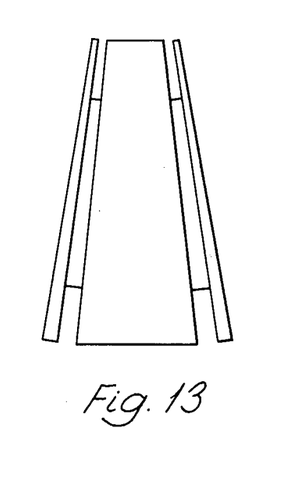

FIGS. 12 and 13 illustrate the need for a shroud according to the present invention to vary in geometry to match changes of cross-section down the length of the structure. A cross-section through the structures shown in FIGS. 12 and 13 is always circular, but the effective diameter D changes continously along the length of each structure; FIG. 12 shown a waisted cylinder with a longitudinally curved side wall, and FIG. 13 a truncated, straight-sided cone. In FIG. 13 it is plain that while the slats lie generally parallel to the slope of the structure surface, the gap distance increases progressively as the diameter increases, and in FIG. 12, on moving down the length of the structure, the gap distance first decreases to the waist and then increases again.

For the sake of simplicity, and generally for the easiest flow control, $\alpha, \beta$ and $\gamma$ may remain constant down the entire length of the structure, but variation is of course possible if desired.

Figures 14, 15:
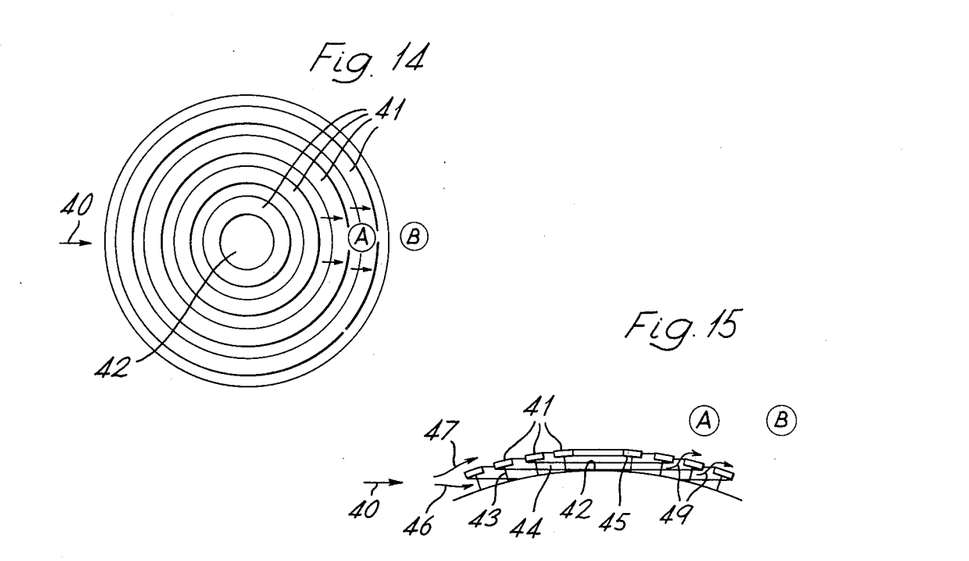
FIGS. 14 and 15 are respectively a plan view and a section through a dome-shaped structure stabilised in a manner according to the present invention.

FIGS. 14 and 15 illustrate an application of the invention to a dome-shaped, for instance the domed roof of a building. When strong winds blow horizontally, as indicated by arrow 40, they tend to excite such a roof into vertical oscillation by means of a mechanism comparable to that by which the fluid movements described with reference to previous figures have excited their structures into transverse oscillation. Comparable protection for such a roof may be provided by a series of coaxial, annular slats 41 fixed to the surface of roof 42 by pegs 43. As with all the other slatted constructions already described, this construction provided a substantially smooth-walled passage between the continuous surface 42 and the basically parallel but discontinuous surface provided by the undersides 45 of slats 41. As the incident fluid meets the roof at 40, a proportion 46 enters passage 44 while the remaining mass of fluid (47) flows over the roof above the other surfaces of slats 41. Assume that in the absence of slats 41, and of the flow 46 in passage 44, mass 47 would have lost much energy by the time it reached location A so that it would there tend to separate from the surface and start to form into vortices. It is suggested that the present invention delays such separation because fluid from flow 46, escaping nearly-tangentially at 49 from the gaps between slats on the downstream side of the roof, enters the mass 47 and adds to its energy, so delaying separation. Ejection of fluid from passage 44 effectively prevents the formation of vortices near the roof; instead, they form away from the roof (say at B) and thus the cause of vertical oscillation of the roof is removed.

Figure 16:
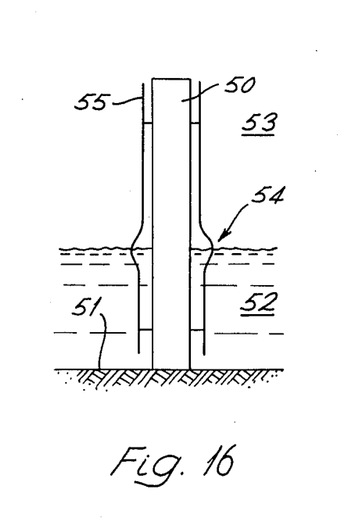
FIG. 16 is a vertical section through a structure according to this invention, subjected in use to a motion relative to two fluids which meet at an interface where waves will be created.

FIG. 16 shows a structure 50, of circular cross-section, mounted on the sea-bed 51. Structure 50 is thus exposed to the flow of sea 52 and air 53, and also to the impact of waves at 54 on the interface between the two media. Structure 50 carries a slatted shroud 55, and it will be apparent that the vital parameters of those parts of the shroud lying deep in the sea are different from the same parameters of the top part of the shroud, these differences reflecting the obviously different characteristics to be expected of the flows of the air and of the sea. However FIG. 16 also shows, in exaggerated form, a considerable increase in the gap $\gamma$ at the wave region 54. Tests have suggested that where such media interfaces and thus waves are to be expected the upper limit for the range of values of $\gamma$, normally 1/5, may rise to ½ or even higher, with some corresponding changes in the values of $\alpha$ and $\beta$. The invention could be applied similarly to parts of a floating marine structure, for instance a semi-submersible oil platform.

Figure 17:
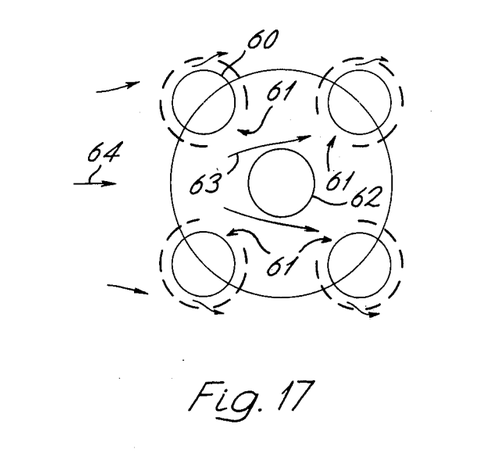
FIG. 17 is a diagrammatic plan view of an installation of several structures according to this invention, arranged so as to diminish the wake buffeting effects of the more forward upon the more rearward.

FIG. 17 illustrates how a cluster of structures may be protected according to this invention so as to diminish the buffeting that the more rearward structures in the cluster will receive from the wake of the more forward. In this figure a cluster of five stacks, all of circular cross-section, are shrouded and arranged in one manner that appears suitable to resist gusts of wind or other fluid from an uncertain direction. The four outer stacks 60 are each almost completely shrouded, the single gap 61 in each shroud facing inwards towards the central stack 62 which is shown unshrouded but could with advantage be completely shrouded if space permitted. Arrows 63, indicating typical paths of flow through the cluster when the general flow remote from the structure is in direction 64, show how the gaps 61 of the most downstream of stacks 60 are well placed to receive the flow into the passage between the stack surfaces and the shroud.

I claim:

1. A structure intended to operate while at least partially immersed in relatively-moving fluid and including a stabilising device carried by said structure, said stabilising device comprising a plurality of slats, said slats being arranged so as to form at least one shroud around at least part of the periphery of said structure, said slats being spaced apart from each other in a peripheral direction whereby said shroud is peripherally discontinuous and whereby slot-shaped gaps extending substantially the full axial length of said shroud are formed between each adjacent set of slats, said shroud being spaced from said structure whereby a passage to receive a proportion of said relatively-moving fluid by way of said slot-shaped gaps is formed between said structure and said shroud, said passage having substantially smooth, spaced confronting inner and outer walls whereby to permit high intensity turbulent flow within said passage of said received fluid, said inner wall of said passage being formed by a continuous surface of said structure, and said outer wall of said passage being a surface substantially parallel to and spaced from the confronting wall of said structure and being an interrupted surface constituted by inward-facing surfaces of said slats.

2. A structure according to claim 1 presenting a cross-sectional salient, in which said shroud is of incomplete peripheral extent but covers said salient, and in which said salient is of such extent that if perpendiculars are drawn to tangents themselves drawn at the two ends of said salient of said structure, said perpendiculars intersect one another at an angle of not less than 60°.

3. A structure according to claim 2 in which the point of said interesection of two said perpendiculars is so located that when a circle is drawn with its centre at said point of intersection and with its radius equal to the distance between said point of intersection and the apex of said salient, then said slats will lie approximately upon a concentric circle of larger radius.

4. A structure according to claim 1, in which said shroud extends around the full said periphery of said structure.

5. A structure according to claim 1, of circular cross-section.

6. A structure according to claim 1, in which the geometry of said slats is such that they are substantially less in thickness than in width, and in which this geometry permits fluid flowing vigorously within said passage to escape from said passage through peripheral spaces between adjacent said slats in a direction having a substantial tangential component relative to said shroud.

7. A structure according to claim 1, in which non-dimensional parameters $\alpha$, $\beta$, $\gamma$ and $\epsilon$, as defined in this specification, have the following ranges of value:

$\frac{1}{4} < \alpha < 3/5$ $1/16 < \beta < 1/5$ $1/12 < \gamma < 1/5$ $\epsilon > 3$.

8. A structure according to claim 7, and liable to be subjected in use to the flow of fluid mass at least two fluids separated by an interface, and in which the value of said parameter $\gamma$ rises to about $\frac{1}{2}$, with corresponding changes in the values of said parameters $\alpha$ and $\beta$, in the vicinity of where said interface will meet said structure.

9. A structure according to claim 1, of polygonal cross-section.

10. A structure according to claim 1, in which said cross-section of said structure varies along the length of said structure.

11. A structure according to claim 1, of domed shape and subject in use to relative flow of fluid having a component of motion in a direction tangential to said dome, and in which said shroud comprises a plurality of co-axial annular slats.

12. An installation comprising a plurality of structures intended to operate while at least partially immersed in relatively moving fluid, at least some of said structures carrying a stabilising device comprising a shroud of peripherally-spaced slats formed around at least part of the periphery of said structure, whereby when said installation is exposed to fluid flow in at least one relative direction, the carrying of said stabilising device by one of said structures relatively upstream relative to said flow diminishes flow-induced oscillations of another of said structures situated relatively downstream relative to said flow.

* * * * *